United States Patent
Butler et al.

(10) Patent No.: US 8,947,410 B2
(45) Date of Patent: Feb. 3, 2015

(54) POWER CALIBRATION OF MULTIPLE LIGHT SOURCES IN A DISPLAY SCREEN

(75) Inventors: Chris Butler, Acton, MA (US); Anand Budni, Bangalore (IN)

(73) Assignee: Prysm, Inc., San Jose, CA (US)

( * ) Notice: Subject to any disclaimer, the term of this patent is extended or adjusted under 35 U.S.C. 154(b) by 476 days.

(21) Appl. No.: 13/154,380

(22) Filed: Jun. 6, 2011

(65) Prior Publication Data

US 2011/0298765 A1 Dec. 8, 2011

Related U.S. Application Data

(60) Provisional application No. 61/352,302, filed on Jun. 7, 2010.

(30) Foreign Application Priority Data

Apr. 15, 2011 (IN) ............................ 1109/DEL/2011

(51) Int. Cl.
- G09G 5/00 (2006.01)
- H04N 9/31 (2006.01)
- G09G 3/02 (2006.01)
- G09G 3/34 (2006.01)

(52) U.S. Cl.
CPC ............. *H04N 9/3129* (2013.01); *G09G 3/025* (2013.01); *H04N 9/3155* (2013.01); *H04N 9/3194* (2013.01); *G09G 3/346* (2013.01); *G09G 2320/0233* (2013.01); *G09G 2320/0693* (2013.01); *G09G 2360/147* (2013.01); *G09G 2320/064* (2013.01)
USPC ........................................................ 345/207

(58) Field of Classification Search
USPC .............................. 345/8, 3.2, 207; 359/216.1
See application file for complete search history.

(56) References Cited

U.S. PATENT DOCUMENTS

| | | | |
|---|---|---|---|
| 2006/0033800 A1* | 2/2006 | Akamatsu | 347/129 |
| 2007/0103388 A1* | 5/2007 | Spitzer | 345/8 |
| 2008/0068295 A1* | 3/2008 | Hajjar | 345/3.2 |

\* cited by examiner

*Primary Examiner* — Kevin M Nguyen
*Assistant Examiner* — Cory Almeida
(74) *Attorney, Agent, or Firm* — Patterson & Sheridan, LLP (57) ABSTRACT

A display device with multiple light sources includes a first detector for detecting a brightness of one or more different portions of the image formed on the display device, a second detector that measures output intensities of the light sources, and a controller that records correlation values that correlate input power settings of the light sources with the detected brightness and the measured output intensities. During operation of the display device, the controller applies the correlation values to determine the proper input power settings of the light sources so that brightness uniformity among the multiple light sources can be achieved.

24 Claims, 9 Drawing Sheets

POWER CALIBRATION OF MULTIPLE LIGHT SOURCES IN A DISPLAY SCREEN

CROSS-REFERENCE TO RELATED APPLICATIONS

This application claims the benefit of India application number 1109/DEL/2011, filed Apr. 15, 2011, which claims benefit of U.S. provisional patent application Ser. No. 61/352, 302, filed Jun. 7, 2010. Both of these related applications are hereby incorporated herein by reference. are hereby incorporated herein by reference.

BACKGROUND OF THE INVENTION

1. Field of the Invention

Embodiments of the present invention generally relate to display screens, and more specifically, to systems and methods for calibrating multiple light sources of such display screens to produce a more uniform image.

2. Description of the Related Art

Electronic display systems are commonly used to display information from computers and other sources. Typical display systems range in size from small displays used in mobile devices to very large displays, such as tiled displays, that are used to display images to thousands of viewers at one time. Multiple light sources are commonly used in such displays. For example, in laser-phosphor displays (LPDs), multiple lasers may be used to simultaneously "paint" different regions of phosphor-containing regions to produce an image for a viewer, where the optical output energy of each laser paints a different phosphor-containing region of the display. Similarly, displays using organic light-emitting diodes (OLEDs) may include multiple light sources, such as banks of light-emitting diodes (LEDs), each light source providing illumination for a specific region of the display screen.

Because the human eye can readily perceive small differences in brightness uniformity of a displayed image, the use of multiple light sources in a display system can produce visual artifacts in an image when the output of each light source is not tightly controlled. Differences in brightness as small as 1% between adjacent light sources are apparent to a viewer, so each light source of a display system must be calibrated to generate light energy with a variation of less than 1% from the other light sources. Otherwise, display system brightness will appear non-uniform. For example, in LPDs, in which each laser may illuminate a different row of pixels on a display screen, lines of higher or lower brightness may be apparent to the viewer if the mismatch in laser power is greater than approximately 1%. Although difficult, providing a display system with multiple light sources having such low mismatch in power output is needed because of manufacturing variations between each light source as well as drift in the performance of each light source over time.

SUMMARY OF THE INVENTION

One or more embodiments of the invention provide a power calibration system for a light-based display device. The power calibration system includes a display screen, light sources for producing light to form an image on the display screen, a first detector for detecting a brightness of one or more different portions of the image formed on the display screen, a second detector that measures at least a portional output intensity of one or more of the light sources, and a controller for controlling one of the light sources to produce the light and recording correlation values that correlate an input power setting of said one of the light sources with the detected brightness of the one or more different portions of the image and the measured portional output intensity.

Another embodiment of the invention provides a method of calibrating the power output of light sources of an imaging display device. The method includes the steps of conveying light produced from the light sources to the display screen to form an image on the display screen, detecting a brightness of one or more different portions of the image formed on the display screen, measuring output intensities derived from the light sources, and recording correlation values that correlate input power settings of the light sources with the detected brightness of the one or more different portions of the image and the measured output intensities of the light sources.

A further embodiment of the invention provides a computer-readable storage medium comprising instructions to be executed by a processing unit of a display device. When the processing unit executes the instructions, it carries out the steps of receiving first data representative of a brightness detected at one or more different portions of an image formed on a display screen of the display device, receiving second data representative of measured output intensities of light sources of the display device used in forming the image on the display screen, and recording correlation values that correlate input power settings of light sources of the display device with the first data and the second data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figures 1, 2:
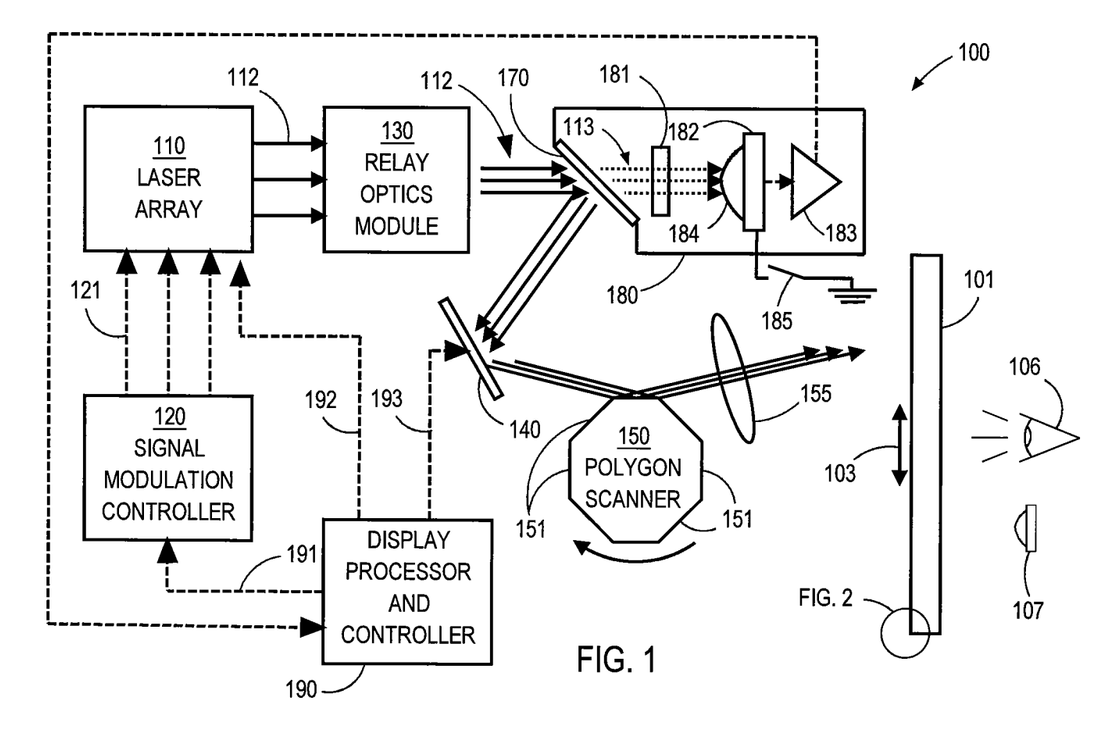
FIG. 1 is a schematic diagram of a display system configured according to embodiments of the invention.
FIG. 2 is a partial schematic diagram of the portion of a screen indicated in FIG. 1.
Figure 2:
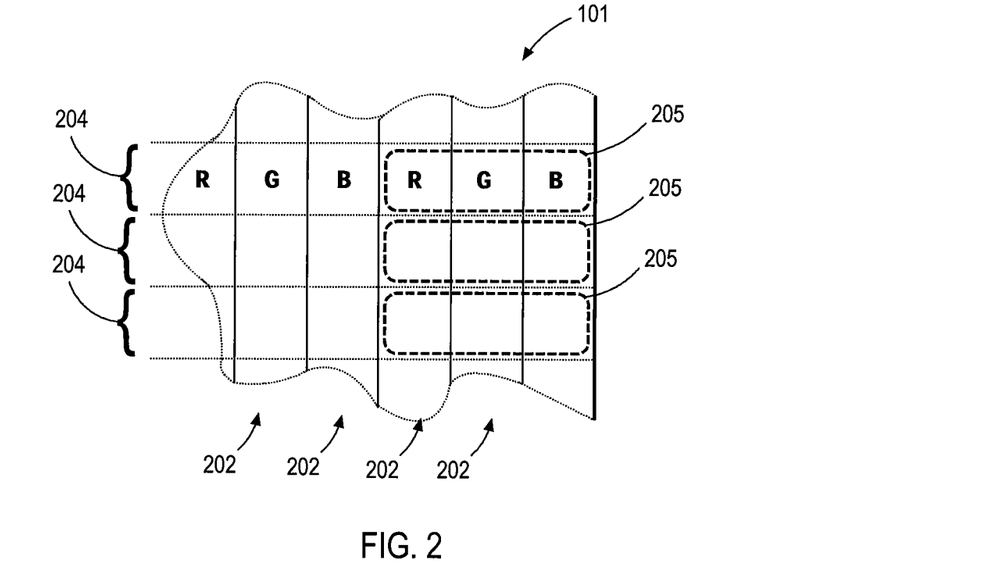

FIG. 1 is a schematic diagram of a display system 100 configured according to embodiments of the invention. Display system 100 is a laser-phosphor display (LPD) that uses multiple light sources, i.e., lasers, for illuminating individual pixels of a fluorescent screen 101, and is configured to calibrate the output intensity of the multiple lasers. Display system 100 includes fluorescent screen 101, a signal modulation controller 120, a laser array 110, a relay optics module 130, a mirror 140, a polygon scanner 150, an imaging lens 155, a beam splitter 170, a detector assembly 180, and a display processor and controller 190, configured as shown. In some embodiments, a photopically corrected detector 107, such as a photometer, CCD array, or other imaging sensor is positioned before the viewing portion of fluorescent screen 101 to facilitate calibration method.

Fluorescent screen 101 includes a plurality of phosphor stripes made up of alternating phosphor stripes of different colors, e.g., red, green, and blue, where the colors are selected so that in combination they can form white light and other colors of light. FIG. 2 is a partial schematic diagram of the portion of fluorescent screen 101 indicated in FIG. 1. FIG. 2 illustrates pixel elements 205, each including a portion of three different-colored phosphor stripes 202. By way of example, in FIG. 2 phosphor stripes 202 are depicted as red, green, and blue phosphor stripes, denoted R, G, and B, respectively. The portion of the phosphor stripes 202 that belong to a particular pixel element 205 is defined by the laser scanning paths 204, as shown. An image is formed on fluorescent screen 101 by directing laser beams 112 (shown in FIG. 1) along the laser scanning paths 204 and modulating the output intensity of laser beams 112 to deliver a desired amount of optical energy to each of the red, green, and/or blue phosphor stripes 202 found within each pixel element 205. Each image pixel element 205 outputs light for forming a desired image by the emission of visible light created by the selective laser excitation of each phosphor-containing stripe in a given pixel element 205. Thus, modulation of the optical energy applied to red, green, and blue portions of each pixel element 205 by the lasers controls the composite color and image intensity at each image pixel element 205. To produce a uniform field on fluorescent screen 101 that appears uniform to the human eye, the output intensity of each laser beam 112 must be controlled to an accuracy of about 1% with respect to the other laser beams 112.

In the embodiment illustrated in FIG. 2, one dimension of the pixel element is defined by the width of the three phosphor stripes 202, and the orthogonal dimension is controlled by the laser beam spot size. In other implementations, both dimensions of image pixel element 205 may be defined by physical boundaries, such as separation of phosphor stripes 202 into rectangular phosphor-containing regions. In one embodiment, each of phosphor stripes 202 is spaced at about a 500 µm to about 550 µm pitch, so that the width of pixel element 205 is on the order of about 1500 µm.

Referring to FIG. 1, laser array 110 includes multiple lasers, e.g., 5, 10, 20, or more, and generates multiple laser beams 112 to simultaneously scan fluorescent screen 101. In one embodiment, the lasers in laser array 110 are ultraviolet (UV) lasers producing light with a wavelength between about 400 nm and 450 nm. Due to manufacturing variations and changes in temperature during operation, the output wavelength of each laser may be different and may drift over time over a significant range, e.g., on the order of 1 to 10 nm. Laser beams 112 are modulated light beams that are scanned across fluorescent screen 101 along two orthogonal directions, e.g., horizontally and vertically, in a raster scanning pattern to produce an image on fluorescent screen 101 for a viewer 106.

Signal modulation controller 120 controls and modulates the lasers in laser array 110 so that laser beams 112 are modulated at the appropriate output intensity to produce a desired image on fluorescent screen 101. Signal modulation controller 120 may include a digital image processor that generates laser modulation signals 121. Laser modulation signals 121 include the three different color channels and are applied to modulate the lasers in laser array 110. In some embodiments, the output intensity of the lasers is modulated by varying the input current or input power to the laser diodes. In some embodiments, the modulation of laser beams 112 may include pulse modulation techniques to produce desired gray-scales in each color, a proper color combination in each pixel, and a desired image brightness.

Together, relay optics module 130, mirror 140, polygon scanner 150, and imaging lens 155 direct laser beams 112 to fluorescent screen 101 and scan laser beams 112 horizontally and vertically across fluorescent screen 101 in a raster-scanning pattern to produce an image. For the sake of description, "horizontal" with respect to fluorescent screen 101 in FIG. 1 is defined as parallel to arrow 103 and "vertical" with respect to fluorescent screen 101 is defined as perpendicular to the plane of the page. Relay optics module 130 is disposed in the optical path of laser beams 112 and is configured to shape laser beams 112 to a desired spot shape and to direct laser beams 112 into a closely spaced bundle of somewhat parallel beams. Depending on the specific configuration of display system 100, laser beams 112 may be slightly diverging or converging when exiting relay optics module 130. Beam splitter 170 is a partially reflective mirror or other beam-splitting optic, and directs the majority, e.g., 99%, of the optical energy of laser beams 112 to mirror 140 while allowing the remainder of said optical energy, i.e., sample beams 113, to enter detector assembly 180 for measurement. The organization and operation of detector assembly 180 is described below. Mirror 140 is a reflecting optic that can be quickly and precisely rotated to a desired orientation, such as a galvanometer mirror, a microelectromechanical system (MEMS) mirror, etc. Mirror 140 directs laser beams 112 from beam splitter 170 to polygon scanner 150, where the orientation of mirror 140 partly determines the vertical positioning of laser beams 112 on fluorescent screen 101. Polygon scanner 150 is a rotating, multi-faceted optical element having a plurality of reflective surfaces 151, e.g., 5 to 10, and directs laser beams 112 through imaging lens 155 to fluorescent screen 101. The rotation of polygon scanner 150 sweeps laser beams 112 horizontally across the surface of fluorescent screen 101 and further defines the vertical positioning of laser beams 112 on fluorescent screen 101. Imaging lens 155 is designed to direct each of laser beams 112 onto the closely spaced pixel elements 205 on fluorescent screen 101.

In operation, the positioning of mirror 140 and the rotation of polygon scanner 150 horizontally and vertically scan laser beams 112 across fluorescent screen 101 so that all of pixel elements 205 are illuminated as desired. To with, as polygon scanner 150 rotates one of reflective surfaces 151 through incident laser beams 112, each of laser beams 112 is directed to sweep horizontally across fluorescent screen 101 from one side to the other, each laser beam following a different vertically displaced laser scanning path 204, thereby illuminating the pixel elements 205 disposed in these laser scanning paths 204 (laser scanning paths 204 and pixel elements 205 are illustrated in FIG. 2). Given N lasers in laser array 110 and N laser beams 112, a "swath" consisting of N laser scanning paths 204 is illuminated as polygon scanner 150 rotates one of reflective surfaces through incident laser beams 112. Because each of reflective surfaces 151 is canted at a different angle with respect to the horizontal, i.e., the plane of the page, when polygon scanner 150 rotates a subsequent reflective surface 151 through incident laser beams 112, the beams sweep horizontally across fluorescent screen 101 at a different vertical location. Thus, given N laser beams and M reflective surfaces 151 of polygon scanner 150, one rotation of polygon scanner 150 "paints" M×N rows of pixels. If fluorescent screen 101 is made up of more than M×N horizontal rows of pixels, then mirror 140 can be repositioned so that another block of M×N horizontal rows of pixels will be painted during the next rotation of polygon scanner 150. Once all pixels of fluorescent screen 101 have been illuminated, mirror 140 returns to an initial or top position and the cycle is repeated in synchronization with the refresh rate of the display.

In one embodiment, the blocks of M×N horizontal rows of illuminated pixels are disposed adjacent to each other on fluorescent screen 101 and the N laser scanning paths 204 in each swath are also adjacent to each other. In another embodiment, one or more blocks of M×N horizontal rows of illuminated pixels are interleaved with other blocks of M×N horizontal rows of illuminated pixels. In such an embodiment, the rows of pixels illuminated during one rotation of polygon scanner 150 are not adjacent to each other and are instead spaced between rows of pixels that belong to a different block of M×N rows.

Display processor and controller 190 is configured to perform control functions for and otherwise manage operation of display system 100. Such functions include receiving image data of an image to be generated, providing an image data signal 191 to signal modulation controller 120, providing laser control signals 192 to laser array 110, producing scanning control signals 193 for controlling and synchronizing polygon scanner 150 and mirror 140, and performing calibration functions according to embodiments of the invention described herein. Specifically, display processor and controller 190 is configured to individually modulate power applied to each laser in laser array 110 in order to adjust the output intensity of each light source.

Display processor and controller 190 may include one or more suitably configured processors, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications as required for the proper operation of display system 100. Display processor and controller 190 may also include one or more input/output (I/O) devices and any suitably configured memory for storing instructions for controlling normal and calibration operations, according to embodiments of the invention. Suitable memory includes a random access memory (RAM) module, a read-only memory (ROM) module, a hard disk, and/or a flash memory device, among others.

Detector assembly 180 is configured to measure the actual output intensity of the lasers in laser array 110 during operation of display system 100 and, according to some embodiments, includes a neutral-density filter 181, a detector 182, and a current-to-voltage converter circuit 183. By directly measuring the optical energy contained in each of sample beams 113 while display system 100 is in operation, drift in laser performance can be immediately compensated for and a more uniform image can be generated by display system 100. To prevent leakage of light from detector assembly 180 that can adversely affect the performance of display system 100, detector assembly 180 is configured to be optically isolated from other regions of display system 100 and internal surfaces thereof are black. Detector 182 is a conventional light detector, such as a standard silicon photodetector, and may be configured with a collepting dome 184 as shown to direct each of sample beams 113 to a central region of detector 182, since sample beams 113 may not be following identical optical paths when entering detector assembly 180 and may require additional optical manipulation to ensure incidence on the active portion of detector 182. Because the response to incident light of detector 182 may vary at different locations on its surface, detector assembly 180 may include optical steering elements in additional to collecting dome 184 that can more precisely direct each of sample beams 113 to substantially the same point on the surface of detector 182. Current-to-voltage converter circuit 183 is configured to convert the signal produced by detector 182, which is an electrical current, to a voltage signal, for ease of measurement. The voltage signal produced by current-to-voltage converter circuit 183, which is a voltage signal proportional to the optical intensity of light incident on detector 182, is provided to display processor and controller 190 so that the power input to a laser being measured can be adjusted accordingly.

To further minimize the spread between the different locations at which each of laser beams 112 strikes detector 182, and to thereby increase the accuracy of detector 182, detector 182 may be positioned at a point in the optical paths of sample beams 113 where sample beams 113 are positioned relatively close together and/or are overlapping with each other. For example, in one embodiment, the laser beams 112 are closest together where they reflect off mirror 140. Consequently, in such an embodiment, by configuring the optical path length between detector 182 and beam splitter 170 to be substantially equal to the optical path length between mirror 140 and beam splitter 170, the sample beams 113 will be as closely spaced on detector 182 as laser beams 112 are on mirror 140.

In operation, light enters detector assembly 180 through beam splitter 170, passes through and is conditioned by neutral-density filter 181, is directed to a point near the center of the surface of detector 182, and is measured by detector 182. Light to be measured by detector 182 is preferably incident near the center of detector 182 to minimize the possibility of any of sample beams 113 from partially or completely missing the surface of detector 182, which would produce inaccurate light intensity values. Because all lasers in laser array 100 are turned on when an image is being formed on fluorescent screen 101, i.e., when swaths of pixels are being painted by laser beams 112, measurements of the output intensity of an individual laser are made in the time interval that occurs between swaths being painted. Such a time interval occurs after each reflective surface 151 of polygon scanner 150 has rotated through incident laser beams 112, such that the laser beams will paint a swath across the targeted locations within the display panel yet before the next reflective surface 151 has been illuminated to paint the subsequent swath across the next targeted locations within the display panel. In this way, a single laser can be cycled on and the output intensity thereof measured directly by detector 182, while minimizing the intensity of unintended light directed toward fluorescent screen 101.

Detector 182 may have an inherent capacitance during operation and therefore may accrue a substantial charge when a relatively high intensity of optical energy is incident thereon. Namely, when all lasers of laser array 110 are on, as when a swath of pixels is being painted by laser beams 112, a portion of the optical energy of every laser in laser array 110 is incident on detector 182, and a substantial charge may accumulate on detector 182 prior to the measurement of an individual laser. Such a residual charge present on detector 182 can significantly affect the accuracy of optical intensity measurements by detector 182. Consequently, in some embodiments, detector assembly 180 is configured with a diode switch 185 that is closed to ground when detector 182 is not actively measuring the output intensity of a laser. In such an embodiment, diode switch 185 is opened immediately prior to measuring output intensity of a laser.

Figure 3:
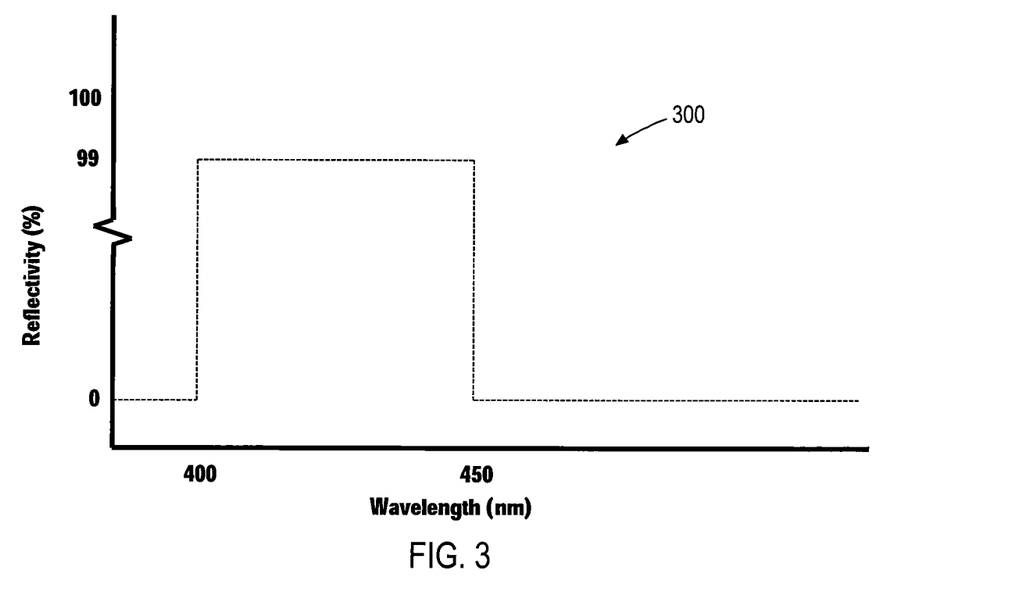
FIG. 3 is a coating curve for a coating on a beam splitter used in the display system of FIG. 1.

In some embodiments, beam splitter 170 is a partially reflective mirror that is formed by a specifically engineered coating on an otherwise transparent optical element. The coating is designed to allow only a small portion, e.g., approximately 1%, of the total incident optical energy of laser beams 112 to pass through beam splitter 170 and to reflect the majority of incident optical energy to mirror 140 and ultimately fluorescent screen 101. FIG. 3 is a coating curve 300 for such a coating on beam splitter 170. Coating curve 300 illustrates the reflectivity of a coating on beam splitter 170 as a function of incident light wavelength. As shown, a coating on beam splitter 170 preferably reflects 99% of light in the wavelength band that corresponds to the operating band of the lasers in laser array 110. In the embodiment illustrated in FIG. 3, the operating band of the lasers in laser array 110 is between about 400 nm and 450 nm. Because the output wavelength of the lasers in laser array 110 may vary over time due to changes in temperature and other factors, wavelength insensitivity of the coating on beam splitter 170 is preferable. Specifically, the portion of coating curve 300 in the operating band of the lasers in laser array 110, e.g., 400 nm-450 nm, is a substantially straight line with a slope of zero and without significant ripple or other variation. When coating curve has such behavior, the same portion of light from laser beams 112, e.g., 1%, will pass through beam splitter 170 and into detector assembly 180 for measurement. Consequently, as the operating wavelength of laser beams 112 varies during operation of display system 100, the portion of light from laser beams 112 that enters detector assembly 180 will remain substantially the same. One of skill in the art, given an operating band and a desired reflectivity, can devise such a coating.

In some embodiments, an LPD display system includes servo control mechanisms based on a designated servo beam that is scanned over the screen by the same optical scanning components that scan laser beams 112 across fluorescent screen 101. This designated servo beam is used to provide servo feedback control over the scanning excitation beams, i.e., laser beams 112, to ensure proper optical alignment and accurate delivery of optical pulses during normal display operation. In such an embodiment, the servo beam is at a different wavelength of light than laser beams 112, e.g., servo beam 402 may be an infra-red (IR) beam, and fluorescent screen 101 is configured to reflect the servo beam to produce servo feedback light.

Figure 4:
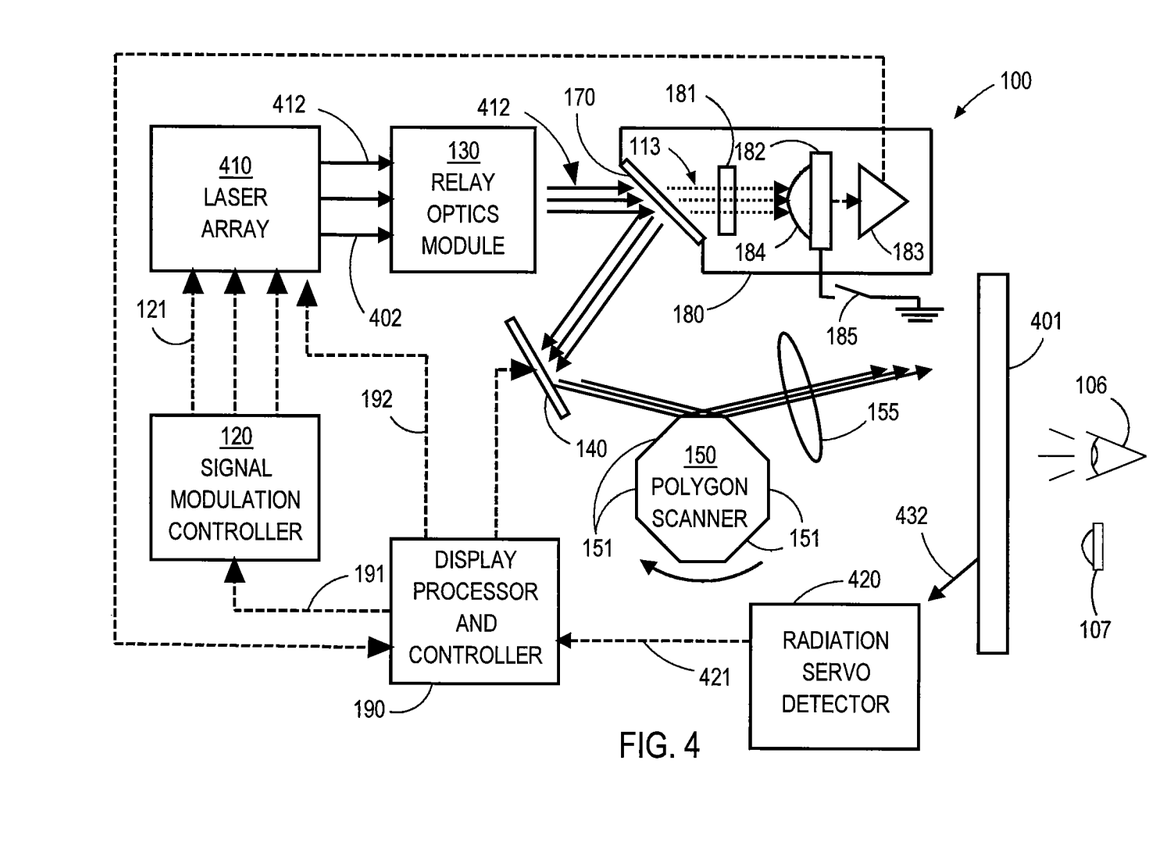
FIG. 4 is a schematic diagram of a display system configured with a servo beam, according to embodiments of the invention.

FIG. 4 is a schematic diagram of a display system 400 configured with a servo beam, according to embodiments of the invention. Display system 400 is an LPD substantially similar to display system 100 in organization and operation, with the following exceptions. Laser array 410 includes, in addition to laser array 110, a laser diode for generating a servo beam 402. Laser beams 412 include laser beams 112 for exciting phosphors and servo beam 402 to provide servo feedback control over laser beams 112. Fluorescent screen 401 includes reflective servo reference marks disposed on fluorescent screen 401, and these reflective servo reference marks reflect servo beam 402 away from fluorescent screen 401 as servo feedback light 432. Display system 400 includes one or more radiation servo detectors 420, which detect servo feedback 432 and direct servo detection signals 421 to display processor and controller 190 for processing. An LPD-based display system configured with a servo beam is described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009, and is incorporated by reference herein.

Because servo beam 402 follows essentially the same optical path as light beams 112 and is therefore incident on beam splitter 170, the reflectivity of beam splitter 170 for light at the wavelength of servo beam 402 directly affects the intensity of servo beam 402 that reaches fluorescent screen 401. Thus, it is desirable for the coating on beam splitter 170 to reflect a relatively high percentage of the optical energy of incident servo beam 402, e.g., 90% or more, to minimize attenuation of servo beam 402 by beam splitter 170.

Figure 5:
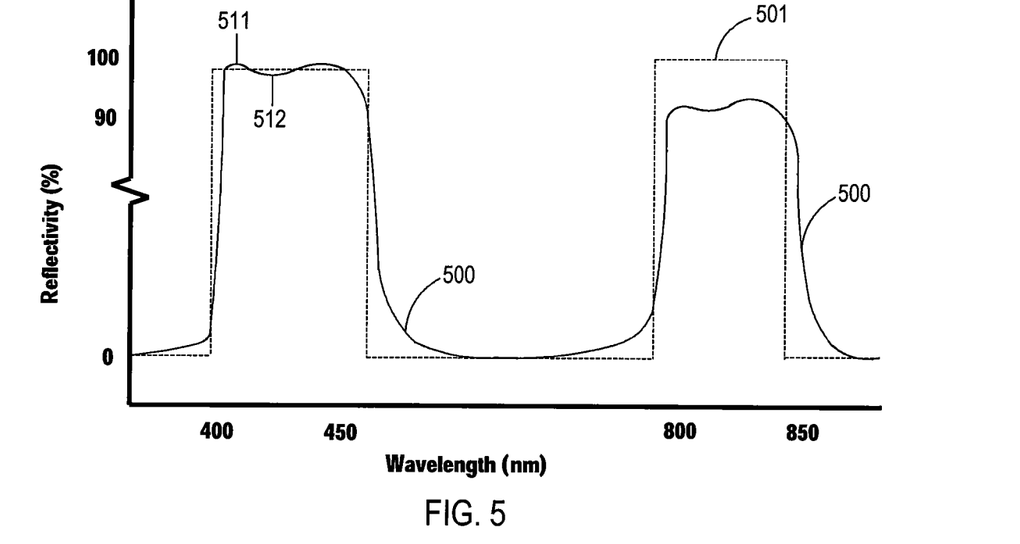
FIG. 5 illustrates a coating curve for a reflective coating on a beam splitter used in the display system of FIG. 4.

FIG. 5 illustrates a coating curve 500 for a reflective coating on beam splitter 170 that has a consideration in the IR regime for servo beam 402. In addition, FIG. 5 includes an ideal coating curve 501 (dashed line) for reference. As shown by ideal coating curve 501, ideally a coating on beam splitter 170 will uniformly reflect 99% of light across the wavelength band that corresponds to the operating band of the lasers in laser array 110 and 100% of light in the operating band of servo beam 402, in this case between about 800 nm and about 850 nm. Due to the complexity of forming a coating operating in multiple wavelength bands, however, realization of such a coating is problematic. In practice, coatings having a performance similar to actual coating curve 500 are more readily constructed, and such coatings affect the performance of display system 400 in two ways. First, actual coating curve 500 does not reflect 100% of incident IR light, which results in at least some attenuation of servo beam 402. Second, the reflectivity of actual coating curve 500 in the operating band of laser beams 112 varies as a function of wavelength. Thus, as the wavelength of each of laser beams 112 varies during operation of display system 400, the quantity of light entering detector assembly 180 from a particular laser will vary even though the actual light output from the laser is constant. For example, when the wavelength of a laser is at a first wavelength 511, actual coating curve 500 indicates that 99.1% of the light is reflected from beam splitter 170 and 0.9% passes through beam splitter 170. When the wavelength of the laser drifts to a second wavelength 512, only 98.9% of the light is reflected from beam splitter 170, 1.1% passes through beam splitter 170. Thus, detector 182 will erroneously measure a change in output intensity of the laser of over 20%. In order to compensate for the ripple and other variation indicated in actual coating curve 500, a coating having complementary reflectivity properties with respect to wavelength is applied to neutral-density filter 181.

Figure 6:
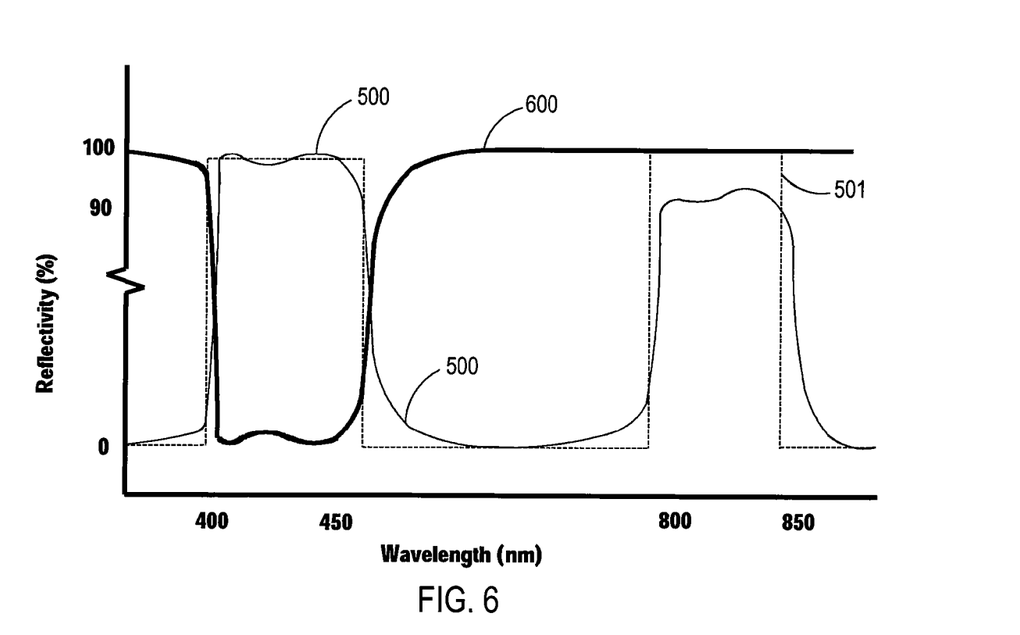
FIG. 6 illustrates a coating curve for a reflective coating deposited on a neutral-density filter, according to embodiments of the invention.

FIG. 6 illustrates a coating curve 600 for a reflective coating that may be deposited on neutral-density filter 181, according to embodiments of the invention. In addition, FIG. 6 includes ideal coating curve 501 and actual coating curve 500 of the reflective coating deposited on beam splitter 170. Coating curve 600 is constructed to compensate for ripple and other variation present in actual coating curve 500, which describes the performance of the reflective coating on beam splitter 170. In other words, coating curve 600, when compared to actual coating curve 500, has an "equal but opposite" variation in reflectivity so that, when light passes through beam splitter 170 and neutral-density filter 181, the effective reflectivity of the two optical elements combined is substantially wavelength independent and approximates ideal coating curve 501. Given a coating curve 500 to be corrected in a single wavelength band, one of skill in the art can construct a coating having complementary reflectivity properties with respect to wavelength, such as coating curve 600.

Figure 7A:
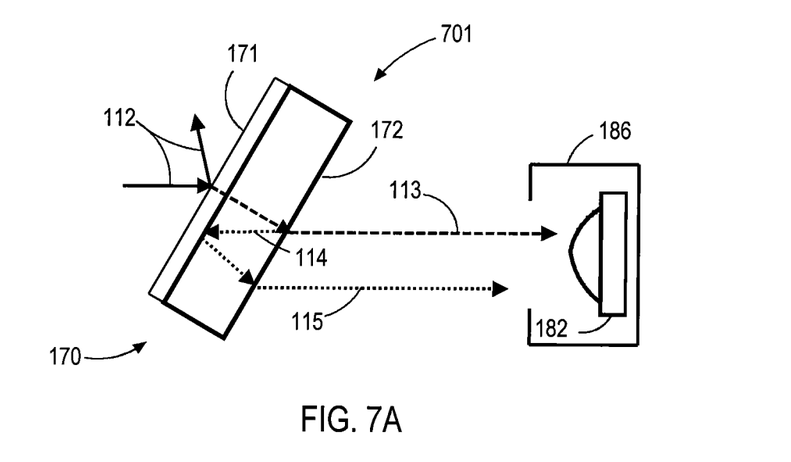
FIG. 7A illustrates a schematic view of a configuration of a beam splitter in which unwanted light energy may enter a detector.

In some embodiments, beam splitter 170 is a partially reflecting mirror configured to minimize unwanted light from unwanted scattering entering detector 182. FIG. 7A illustrates a schematic view of a configuration 701 of beam splitter 170 in which unwanted light energy may enter detector 182. In configuration 701, beam splitter 170 is a partially reflecting mirror and includes a partially reflective coating 171. Laser beams 112 strike partially reflective coating 171, and sample beam 113 is refracted toward rear surface 172 of beam splitter 170. The majority of sample beam 113 continues on to detector 182 for measurement, but a small portion of sample beam 113 is internally reflected as internally reflected beam 114. Internally reflected beam 114 may have approximately 4% of the optical energy originally contained in sample beam 113. As shown, 99% of internally reflected beam 114 reflects from partially reflective coating 171, passes through rear surface 172, and due to further refraction, is directed toward detector 182 as ghost beam 115. Because the optical paths of each of laser beams 112 may not be perfectly coincident in a display system, each laser beam 112 may be incident on partially reflective coating 171 at a slightly different location. Consequently, some of ghost beams 115 may strike detector 182 and some of ghost beams 115 may fall outside of detector baffle 186. Ghost beams 115 striking detector 182 form a "ghost spot" thereon, which will introduce an error that may be as large as several times the acceptable error limit for detector 182.

Figure 7B:
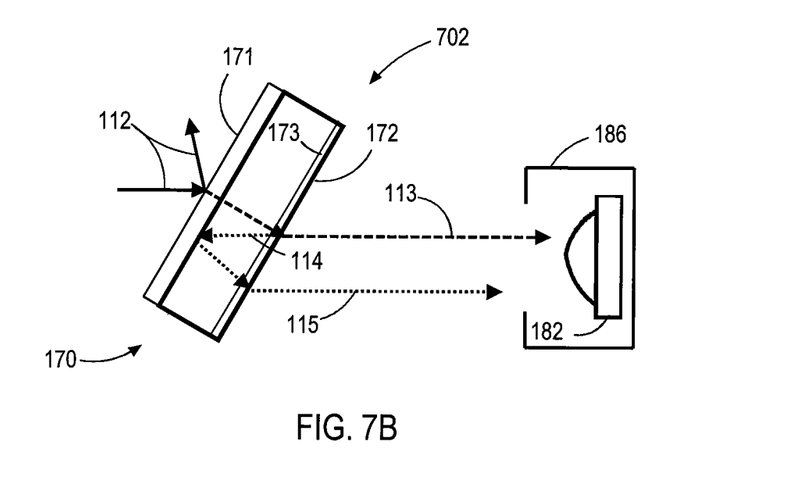
FIG. 7B illustrates a schematic view of a configuration of a beam splitter in which an anti-reflective (AR) coating prevents unwanted light energy from entering a detector, according to embodiments of the invention.

FIG. 7B illustrates a schematic view of a configuration 702 of beam splitter 170 in which an anti-reflective (AR) coating prevents unwanted light energy from entering detector 182, according to embodiments of the invention. In configuration 702, beam splitter 170 has an AR coating 173 formed on rear surface 172. In such a configuration, AR coating 173 reduces the optical energy contained in ghost beam 115, since reflected beam 114 is substantially attenuated.

Figure 7C:
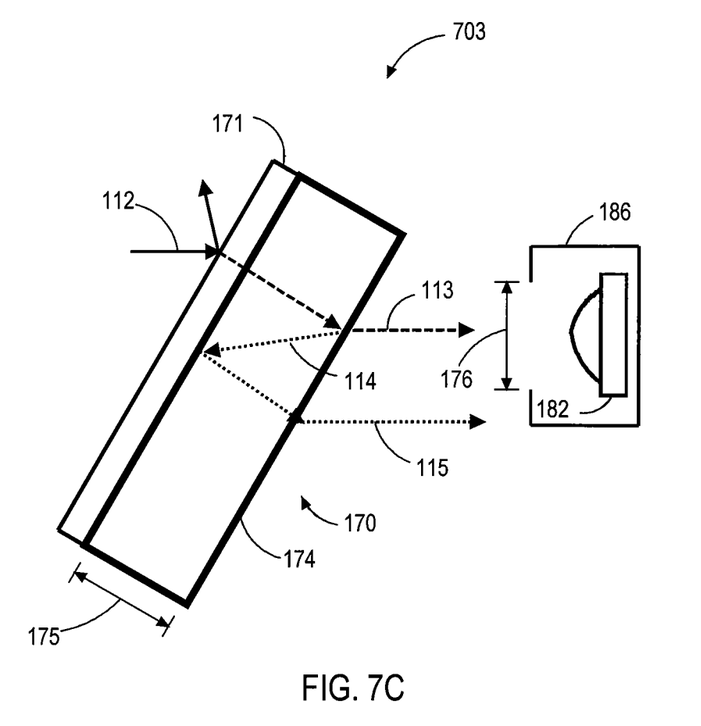
FIG. 7C illustrates a schematic view of a configuration of a beam splitter in which the body of a beam splitter is configured to direct unwanted light energy away from a detector, according to embodiments of the invention.

FIG. 7C illustrates a schematic view of a configuration 703 of beam splitter 170 in which the body 174 of beam splitter 170 is configured to direct unwanted light energy away from detector 182, according to embodiments of the invention. In configuration 703, body 174 has a thickness 175 that directs ghost beams 115 away from the opening of detector baffle 186 as shown. A suitable thickness 175 for configuration 703 is dependent on the angle of incidence of laser beams 112 to partially reflective coating 171, the width 176 of the opening of detector baffle 186, the index of refraction of body 174, and the possible range of locations at which the different laser beams 112 may be incident on partially reflective coating 171. Upon reading the disclosure herein, thickness 175 can be readily determined by one of skill in the art.

Figure 8:
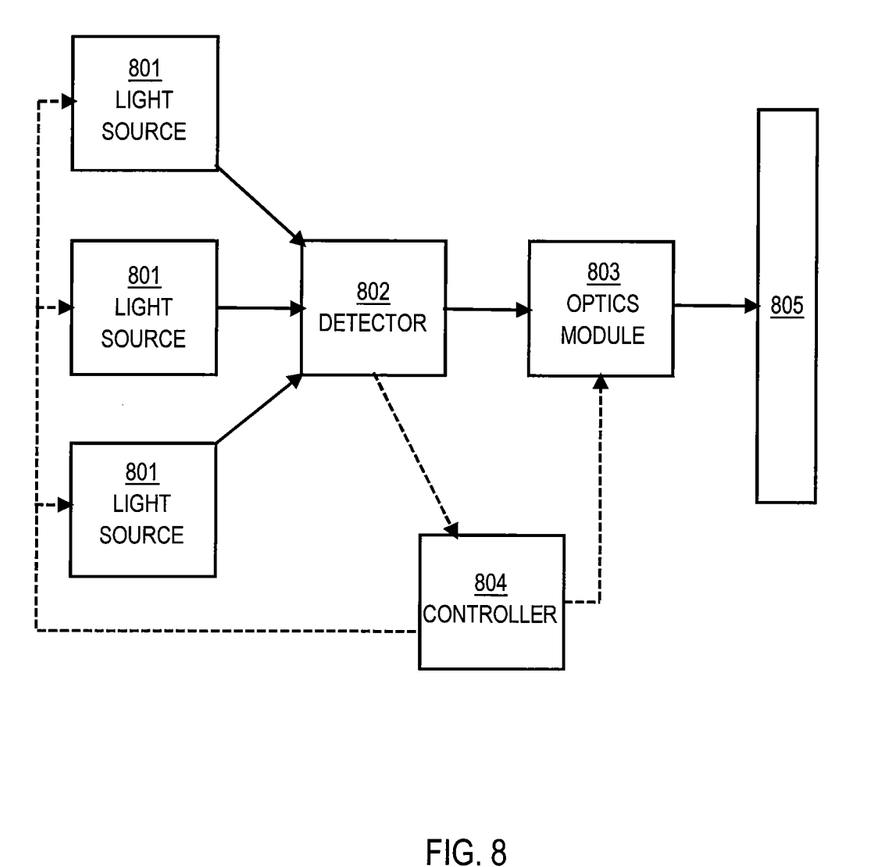
FIG. 8 is a block diagram of a display system, according to embodiments of the invention.

In some embodiments of the invention, a display system may have a different light engine and/or display screen than a LPD. Laser imaging, light-emitting diode (LED) digital light processing (DLP), and LED-liquid crystal display (LCD) systems may also be configured to calibrate and adjust the output of multiple light sources of the display device to produce a more uniform image with the display device. FIG. 8 is a block diagram of a display system 800, according to embodiments of the invention. Display system 800 includes multiple light sources 801, a detector 802, an optics module 803, a controller 804, and a display screen 805. Light sources 801 may be lasers, individual LEDs, or independent banks of multiple LEDs. Detector 802 may be any light detection device suitably configured for measuring the output intensity of each of light sources 801 and providing controller 804 with an output intensity signal for each of light sources 801. Optics module 803 may be any optical system configured to direct light from light sources 801 to display screen 805. Controller 804 may be similar in organization to display processor and controller 190 in FIG. 1, and is configured to receive output intensity signals from each light source 801. Controller 804 is further configured to individually modulate power applied to each light source 801 in order to adjust the output intensity thereof in accordance with desired display values and correlation values that are determined during factory-calibration as further described below.

Figure 9:
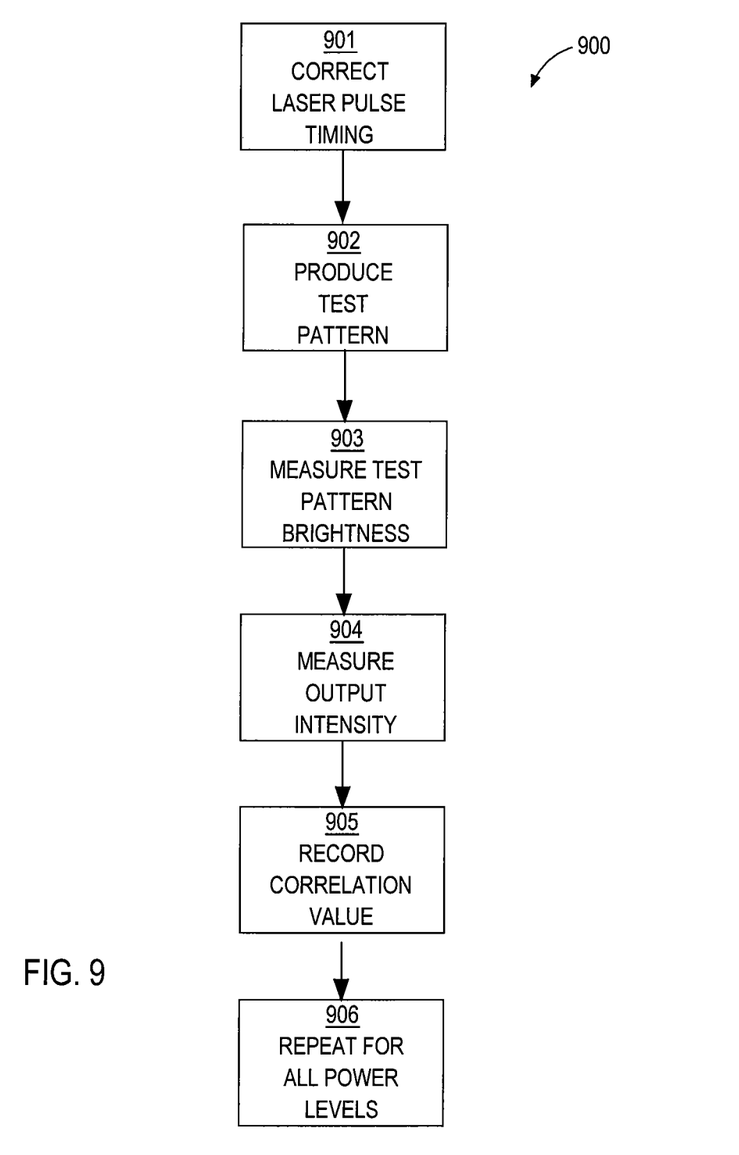
FIG. 9 is a flow chart that summarizes, in a stepwise fashion, a method for performing a factory calibration of a display system having multiple light sources, according to embodiments of the invention.

FIG. 9 is a flow chart that summarizes, in a stepwise fashion, a method 900 for performing a factory calibration of a display system having multiple light sources, according to embodiments of the invention. By way of illustration, method 900 is described in terms of an LPD-based electronic display device substantially similar in organization and operation to display system 400 in FIG. 4. However, other electronic display devices may also benefit from the use of method 900. Prior to the first step of method 900, a gain-adjustment procedure is performed on detector 182, in which each of the lasers of laser array 410 is set to maximum output intensity, and the gain of current-to-voltage converter circuit 183 is adjusted so that detector 182 is not saturated by a gain that is too high or has a gain that is too low. The gain adjustment may be performed using a circuit-board-mounted potentiometer that is part of current-to-voltage converter circuit 183. In some embodiments, the gain adjustment may be digitally set and in other embodiments it may be a fixed gain value.

In step 901, the correct timing of laser pulsing is confirmed by shifting the timing of laser pulses earlier and later, thereby determining the center of each of phosphor stripe 202. Specifically, when the timing is too early or too late, a portion of the laser spot will fall outside the phosphor stripes 202 and the brightness of pixels on fluorescent screen 101 will be attenuated. Therefore, the timing of laser pulses can be adjusted to fall directly between earlier pulse timing that causes brightness attenuation and later pulse timing that causes brightness attenuation.

In step 902, a test pattern is produced on fluorescent screen 101 by one of the lasers in laser array 110. The test pattern is generated at a single constant input power value for the laser for the duration of steps 902-904. In one embodiment, the test pattern is a single pixel element, i.e., the adjacent portions of a red, a green and a blue phosphor stripe 202 contained in a single laser scanning path 204, as illustrated in FIG. 2. In another embodiment, the test pattern is a block of multiple adjacent pixel elements that are all illuminated by the same laser, e.g., a strip of adjacent pixel elements 20 pixel elements long and 1 pixel element wide.

Steps 903 and 904 may occur either substantially simultaneously or sequentially. In step 903, photopically corrected detector 107 is used to measure the brightness of the test pattern being produced on fluorescent screen 101. Use of a photopically corrected sensor ensures that the frequencies of light that are less visible or completely invisible to the human eye do not bias the brightness measurement made in step 903.

In step 904, detector 182 measures the output intensity of the laser at the current input power. In some embodiments, the output intensity measurement of step 904 takes place during the time interval that occurs between swaths being painted by the laser.

In step 905, the brightness measurement of step 903, the output intensity measurement of step 904, and the associated input power setting of the laser are recorded in memory as correlation values.

In step 906, steps 902-905 are repeated for a plurality of power levels across the dynamic range of the laser. In one embodiment, step 906 is performed for each possible input power setting of the laser. For example, given a laser that is controlled with 8-bit precision, steps 906 can be performed for all 256 different input power settings. In another embodiment, step 906 is performed for a smaller number of different input power settings and interpolation may be used to determine the correlation values associated with the other input power settings. Upon completion of step 906, a complete table of correlation values is constructed for one laser in laser array 410, in which a measured screen brightness value is associated with each input power setting and each output intensity of the laser measured by detector 182.

Method 900 may then be repeated for each laser in laser array 410. Alternatively, because using method 900 to determine a relatively large number of correlation values for multiple lasers can be prohibitively time-consuming, method 900 may be performed on some or all of the lasers in laser array 410 simultaneously. In such an embodiment, the test pattern in step 902 is configured so that each laser being tested illuminated a separate region of fluorescent screen 101, thereby allowing measurement of the brightness produced on fluorescent screen 101 by each individual laser being tested. The optimal pattern may be different depending on specific features of the architecture of display system 400, such as pixel turn-on times, optical cross-talk, electrical channel crosstalk, etc. In one embodiment, the test patterns of multiple lasers may be staged at different locations across fluorescent display 101 to further reduce the effects of cross talk on laser performance during method 900.

Figure 10:
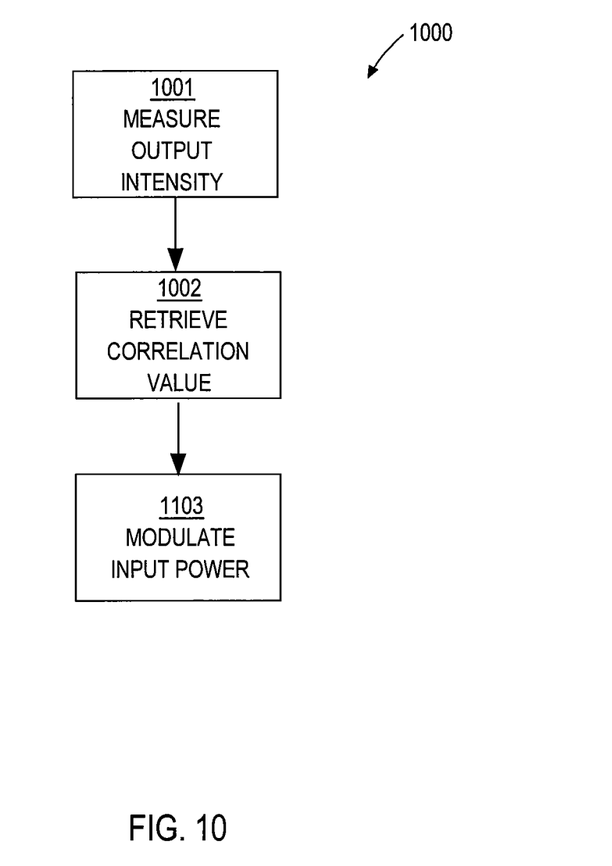
FIG. 10 is a flow chart that summarizes, in a stepwise fashion, a method of controlling output intensity of a light source, such as a laser beam, that is scanned across a display screen, according to embodiments of the invention.

FIG. 10 is a flow chart that summarizes, in a stepwise fashion, a method 1000 of controlling output intensity of a light source, such as a laser beam, that is scanned across a display screen, according to embodiments of the invention. By way of illustration, method 1000 is described in terms of an LPD-based electronic display device substantially similar in organization and operation to display system 400 in FIG. 4. However, other electronic display devices may also benefit from the use of method 1000. Prior to the first step of method 1000, a table of correlation values is constructed that correlates actual brightness produced at fluorescent screen 101 by the laser with the input power setting of the laser and the output intensity measured by detector 182. In one embodiment, the table of correlation values is constructed according to method 900.

In step 1001, detector 182 measures the output intensity of a laser at a current input power setting. In some embodiments, the output intensity measurement of step 1000 takes place during the time interval that occurs between swaths being painted by the laser.

In step 1002, the appropriate correlation values associated with the input power setting are retrieved from the table of correlation values constructed for the laser.

In step 1003, the input current to the laser is modulated based on the output intensity measured in step 1001, and the desired optical output of the laser as determined from the correlation values retrieved in step 1002. The input power setting of the laser is increased if the measured intensity is less than the desired intensity and decreased if the measured intensity is greater than the desired intensity, and unchanged if the measured intensity is equal to the desired intensity.

In some embodiments, method 1000 is performed for all lasers in laser array 410 throughout normal operation of display system 400. In this way, the actual brightness of the multiple light sources of display system 400 are dynamically controlled to a high level of accuracy, since the output intensity of each is constantly compared to a known value that was determined using an external sensor, i.e., photopically corrected detector 107.

When a single laser in laser array 110 degrades in performance, the other lasers laser array 110 may all be reduced in output intensity. Reducing the output intensity of the other lasers to match the reduced output intensity of the degraded laser would maintain absolute brightness uniformity across fluorescent screen 101 but would significantly reduce overall brightness of fluorescent screen 101. Instead, according to one or more embodiments of the invention, lasers of laser array 110 that generate laser beams that are scanned across fluorescent screen 101 directly above and directly below the laser beam generated by the degraded laser are reduced in output intensity but not as much as the degraded laser. Other lasers are reduced in output intensity in a similar manner such that the amount of reduction in output intensity decreases as the position of the laser beam generated from such other lasers moves further away from the position of the laser beam generated by the degraded laser. The maximum allowable reduction gradient is dependent on the contrast sensitivity of the human eye. In one embodiment, the reduction gradient is on the order of 0.1%.

While the foregoing is directed to embodiments of the present invention, other and further embodiments of the invention may be devised without departing from the basic scope thereof, and the scope thereof is determined by the claims that follow.

We claim:

1. A power calibration system for a light-based display device, comprising:
    a display screen having a viewing side and an excitation side;
    light sources for producing light to form an image on the display screen;
    a first detector for detecting a brightness of one or more different portions of the image formed on the display screen;
    a detector assembly including a second detector that measures at least a portional output intensity of one or more of the light sources, wherein the detector assembly is disposed on the excitation side of the display screen, and wherein the detector assembly further includes a neutral-density filter and a current-to-voltage converter circuit; and
    a controller for controlling one of the light sources to produce the light and recording correlation values that correlate an input power setting of said one of the light sources with the detected brightness of the one or more different portions of the image and the measured portional output intensity.

2. The system of claim 1, wherein the first detector is photopically corrected.

3. The system of claim 1, wherein the different portions include one or more pixels of the image.

4. The system of claim 1, wherein the correlation values are recorded for each of the light sources during factory calibration, and used when modulating power driven to the light sources during operation of the light-based display device.

5. The system of claim 4, wherein the correlation values are recorded for a number of different brightness levels.

6. The system of claim 4, wherein the light sources are laser beam sources for producing laser beams, the system further comprising a beam splitter disposed in optical paths of the laser beams and directing a portion of the laser beams to the second detector.

7. The system of claim 6, wherein the laser beam sources include an imaging beam source operating in a first wavelength band and a servo beam source operating in a second wavelength band, and the beam splitter includes a coating that transmits a portion of an imaging beam produced by the imaging beam source.

8. The system of claim 7, wherein the beam splitter has a first surface on which the coating is applied and a second surface, the portion of the imaging beam being directed through the first surface and then to the second surface.

9. The system of claim 8, wherein the second surface has an anti-reflective coating 10. The system of claim 8, wherein the beam splitter is configured to refract light reflecting off the second surface away from the second detector.

11. The system of claim 6, further comprising a filter positioned in an optical path of the portion of the imaging beam between the beam splitter and the second detector and configured to attenuate laser beams transmitted therethrough by variable amounts as a function of wavelength.

12. The system of claim 6, wherein the second detector has a gain setting.

13. The system of claim 6, further comprising a lens between the beam splitter and the second detector for directing the portion of the laser beams onto a central region on the second detector.

14. The system of claim 6, further comprising:
a rotating polygon having a plurality of mirrored facets, each mirrored facet causing the laser beams to be scanned across the display screen; and
a reflective surface disposed in the optical paths of the laser beams between the beam splitter and the rotating polygon,
wherein the beam splitter directs a remaining portion of the laser beams to the reflective surface, and a first distance between the beam splitter and the reflective surface is substantially equal to a second distance between the beam splitter and the second detector.

15. The system of claim 14, further comprising a housing for the portion of the laser beams directed to the second detector and the second detector, the housing optically isolating the portion of the laser beams directed to the second detector from the rotating polygon and the reflective surface and isolating the remaining portion of the laser beams from the second detector.

16. The system of claim 1, wherein the first detector is disposed on the viewing side of the display screen.

17. The system of claim 1, wherein at least a portional output intensity of the one or more of the light sources is from an optical element that divides the output intensity into a portional output intensity portion and a majority output intensity portion.

18. A method of calibrating power output of light sources of an imaging display device, comprising:
conveying light produced from the light sources to the display screen to form an image on the display screen, wherein the light sources and an image emission source are distinct from one another and the light from the light sources contribute to forming the image on the display screen;
detecting a brightness of one or more different portions of the image formed on the display screen using a first detector;
measuring output intensities derived from one or more the light sources using a detector assembly having a second detector, a neutral-density filter and a current-to-voltage converter circuit; and
recording correlation values that correlate input power settings of the light sources with the detected brightness of the one or more different portions of the image and the measured output intensities of the one or more light sources.

19. The method of claim 18, wherein the brightness of the one or more different portions of the image is detected by a photopically corrected detector.

20. The method of claim 18, wherein the different portions include one or more pixels of the image.

21. The method of claim 18, wherein the correction factors are computed for a number of different brightness levels.

22. The method of claim 18, wherein measuring output intensities derived from the light sources occurs on an excitation side of the display screen and detecting a brightness of one or more different portions of the image occurs on a viewing side of the display screen.

23. The method of claim 18, wherein at least a portional output intensity of the one or more of the light sources is from an optical element that divides the output intensity into a portional output intensity portion and a majority output intensity portion.

24. A non-transitory computer-readable storage medium comprising instructions to be executed by a processing unit of a display device to carry out the steps of:
receiving first data representative of a brightness detected by a first detector at one or more different portions of an image formed on a display screen of the display device;
receiving second data representative of measured output intensities of one or more light sources of the display device used in forming the image on the display screen, wherein the light sources and an image emission source are distinct from one another and light from the light sources contributes to forming the image on the display screen, and wherein the output intensities of the one or more light sources are measured by a detector assembly having a second detector, a neutral-density and a current-to-voltage converter circuit; and
recording correlation values that correlate input power settings of light sources of the display device with the first data and the second data.

* * * * *

UNITED STATES PATENT AND TRADEMARK OFFICE
CERTIFICATE OF CORRECTION

| | | |
|---|---|---|
| PATENT NO. | : 8,947,410 B2 | Page 1 of 1 |
| APPLICATION NO. | : 13/154380 | |
| DATED | : February 3, 2015 | |
| INVENTOR(S) | : Butler et al. | |

It is certified that error appears in the above-identified patent and that said Letters Patent is hereby corrected as shown below:

In the Specification

Column 5, Line 4, please delete "with" and insert -- wit -- therefor;

Column 6, Line 19, please delete "collepting" and insert -- collecting -- therefor.

Signed and Sealed this
Thirtieth Day of June, 2015

Michelle K. Lee
*Director of the United States Patent and Trademark Office*